United States Patent [19]

Föttinger et al.

[11] Patent Number: 5,387,382
[45] Date of Patent: Feb. 7, 1995

[54] METHOD FOR MANUFACTURING INTERIOR FITTED PART FOR MOTOR VEHICLE

[75] Inventors: Walter Föttinger; Hansjörg Grimm; Michael Hauber, all of Weinheim; Hans Hettenbach, Ladenburg; Patra Hofmann, Heidelberg; Gerhard Schaut, Hemsbach, all of Germany

[73] Assignee: Firma Carl Freudenberg, Weinheim, Germany

[21] Appl. No.: 196,826

[22] Filed: Feb. 15, 1994

Related U.S. Application Data

[63] Continuation of Ser. No. 14,963, Feb. 8, 1993, abandoned.

[30] Foreign Application Priority Data

Feb. 22, 1992 [DE] Germany .............. 4205464

[51] Int. Cl.$^6$ ............................................. B29C 43/02
[52] U.S. Cl. ................................... 264/113; 264/120; 264/122; 156/296
[58] Field of Search .................. 264/113, 120, 122; 156/296

[56] References Cited

U.S. PATENT DOCUMENTS

| | | | |
|---|---|---|---|
| 2,836,576 | 5/1958 | Piccard et al. | 260/45.4 |
| 3,620,892 | 11/1971 | Wincklhofer et al. | 264/122 |
| 3,876,745 | 4/1975 | Fleissner | 264/122 |
| 3,989,788 | 2/1976 | Estes et al. | 264/120 |
| 4,131,664 | 12/1978 | Flowers et al. | 264/113 |
| 4,164,600 | 8/1979 | Yung et al. | 428/198 |
| 4,195,112 | 3/1980 | Sheard et al. | 264/122 |
| 4,285,748 | 8/1981 | Booker et al. | 156/167 |
| 4,418,031 | 11/1983 | Doerer et al. | 264/122 |
| 4,488,928 | 12/1984 | Khan et al. | 156/495 |
| 4,568,581 | 2/1986 | Peoples, Jr. | 428/35 |
| 4,734,321 | 3/1988 | Radvan et al. | 428/283 |
| 4,812,283 | 3/1989 | Farley et al. | 264/518 |

FOREIGN PATENT DOCUMENTS

| | | |
|---|---|---|
| 0078702 | 5/1983 | European Pat. Off. . |
| 0372572 | 6/1990 | European Pat. Off. . |
| 0469309 | 2/1992 | European Pat. Off. . |
| 2937399 | 4/1981 | Germany . |
| 3629230 | 3/1988 | Germany . |
| 9010276 | 11/1990 | Germany . |
| 9013112 | 11/1990 | Germany . |
| 9013113 | 2/1991 | Germany . |
| WO92/07898 | 5/1992 | WIPO . |

OTHER PUBLICATIONS

Polyesterfasern, Dr. H. Ludewig, pp. 483–484, Akademie Verlag, 1975.
Vliesstoffe, J. Lünenschloss & W. Albrecht, p. 45, G. Thieme Verlag, 1982.
Synthesefasern, Verlag Chemie (1981), pp. 68–71, 126–127.

*Primary Examiner*—Mary Lynn Theisen
*Attorney, Agent, or Firm*—Kenyon & Kenyon

[57] ABSTRACT

In a process for manufacturing an interior fitted part for motor vehicles, such as an inside roof lining for automobiles, a staple-fiber formed fabric of a drawn polyethylene terephthalate matrix component and of a binding component is subjected at least once during the process to an annealing process, which increases the thermal stability of the fitted part. Also disclosed is a fitted part manufactured by this method.

16 Claims, No Drawings

METHOD FOR MANUFACTURING INTERIOR FITTED PART FOR MOTOR VEHICLE

This application is a continuation, of application No. 08/014,963, filed Feb. 8, 1993, now abandoned.

BACKGROUND OF THE INVENTION

The present invention relate to the manufacture of an interior fitted part for motor vehicles. More particularly, the present invention relates to an inside roof lining for motor vehicles, and to an interior fitted part that is manufactured in accordance with this method.

One problem posed by fitted parts used in the passenger compartments of motor vehicles, and in particular posed by freely suspended inside roof linings, is that these parts must be resistant to moisture and be able to withstand high coefficients of heat transfer, without drooping. In this connection, it is known that the passenger compartments of motor vehicles can reach temperatures of up to 110° C. due to solar irradiation. Such temperatures can also occur in spraying operations during manufacturing.

Fitted parts made of formed, adhesive-bonded fabric material that fulfill the above requirements typically contain or consist of polyester fibers. These fitted parts acquire their thermal stability after being impregnated with thermosetting synthetic-resin binding agents, such as those described by German Published Patent Application No. 29 37 399 or, additionally, after receiving an admixture having glass fibers in an amount up to 100% by weight, as described in German Published Patent Application No. 36 29 230.

However, these known fitted parts cannot be recycled due to the presence of synthetic resins, fiberglass components or both. In particular, the parent substance of the polyester fibers cannot be melted down to obtain inferior, reusable polyester material which can be then re-granulated. Also, equivalent polyester cannot be regeneratively recovered through alcoholysis because the additional materials used to produce the thermal stability can not be satisfactorily isolated from the polyester components before the regeneration process. Therefore, there remains the need for fitted parts that can be recycled, while at the same time having the necessary characteristics.

SUMMARY OF THE INVENTION

The present invention addresses this need by providing a method that makes it possible to use recyclable fibers that do not exhibit any significant water absorptive capacity and which achieve a thermal stability that satisfies the requirements of the automotive industry, even though the fibers are not impregnated with binding agents or provided with glass fibers. These industry requirements correspond to a modulus of elasticity value for bending, pursuant to standard EN 63 at a test temperature of 90° C., of more than 30 N/mm$^2$ for a material thickness of 3 mm and a substance weight of 1000 g/m$^2$. Another advantage of the method according to the present invention is that one obtains a fitted part which is very lightweight, because the fitted part does not need to be impregnated with a binding agent to increase thermal stability.

These and other advantages are achieved by a method according to an embodiment of the present invention wherein a fabric is first subjected to a carding step. The fabric comprises up to 60% by weight of a matrix component and at least 40% by weight of a binding component. The matrix component further comprises drawn polyethylene terephthalate matrix fibers having a staple length of 15 to 100 mm and a titer of 4 to 30 decitex. The binding component further comprises binding fibers selected from undrawn polyethylene terephthalate fibers and copolyester fibers. The binding fibers have a staple length of 15 to 100 mm, a titer of 4 to 30 decitex and a melting point that is 30 to 120° C. lower than that of the matrix fibers. After carding, the fabric is pre-compacted using needle punching means, surface heating means, or a combination of needle punching surface heating means. The fabric is then preheated in a preheating oven for a period of one to five minutes at a temperature which lies 10° to 30° C. above the melting temperature of the binding fibers and which lies below the melting temperature of the matrix fibers. The fabric is then subjected to a molding pressure in a form tool at a temperature which lies at least 10° C. below the melting point of the binding fibers, followed by annealing at a temperature ranging from 140° to 240° C. for a period ranging from two hours to one minute.

DETAILED DESCRIPTION

According to an embodiment of the present invention, a bonded fiber fabric is initially produced by carding polyester staple fibers. Two fiber components, a matrix component and a binding component, are involved. The matrix component can be, for example, drawn polyethylene terephthalate, which preferably have a melting point of about 260° C. The binding (or thermoplastic) component can be, for example, undrawn polyethylene terephthalate or a copolyester having a melting point that is lower by 30° to 120° C. than that of the matrix component. All of the fibers in the bonded fiber fabric should preferably have a staple length of 15° to 100 mm and a titer of 4 to 30 decitex.

According to another embodiment, the bonded fiber fabric is preferably comprised of 50 to 100% by weight of bicomponent conjugated fibers. These fibers are provided in either a side-by-side arrangement or a core/sheathing arrangement. The core or one of the two sides consists, for example, of the above polyethylene terephthalate matrix component, and the sheathing or the other of the two sides consists of the above copolyester binding component. This embodiment is quite simple to process and provides desirable results, as shall be shown in later examples.

According to another embodiment of the invention, it is also possible to employ fibers of the above-described matrix component, as well as binding component fibers having, for example, a titer of 3 to 8 decitex and consisting either of undrawn polyethylene terephthalate or of a copolyester which melts at about 240° C. The binding component fiber is preferably present in an amount corresponding to 40 to 90% by weight of the bonded fiber fabric.

The bonded fiber fabric in accordance with one of the above-mentioned embodiments is preferably laid down using known carding means and is subsequently pre-compacted so that it receives an inner coherence. Pre-compaction can be implemented such that the binding component fibers are heat activated by means of known methods, such as needle punching, the action of surface heat (for example, between calendar rolls) or both.

According to another embodiment of the invention, it is possible to integrate a first annealing operation with the above pre-compacting process by heating the bonded fabric, for example, at temperatures of 140° to 40° C. and for periods of from two hours down to one minute.

This first annealing process apparently has a specific effect on the pre-drawn polyethylene terephthalate. Without being held to any particular theory, it is believed that the annealing process initiates crystallization, leading to a significant improvement in the thermal stability of the bonded fiber fabric as compared to material that has not been annealed.

The pre-compacted fabric is then subjected to a preheating step by a known method, wherein, for example hot circulating air or heated plates act on the binding components. In the event that an oven is used, the temperature is preferably set at 10° to 30° C. over the melting point of the binding fiber component, but in any event is set lower than the melting point of the drawn polyethylene terephthalate matrix component. Treatment periods ranging from 1 to 5 minutes are customary.

In a subsequent step, the preheated fabric is introduced into a form tool that corresponds to the shape of the finished fitted part and is exposed to a molding pressure between 105 and $2 \times 10^6$ Pa. The temperature of the form tool should be at least 10° C. less than the temperature at which the binding component melts. After a period of time, for example, 0.2 to 2 minutes, the finished fitted part can be removed from the mold and further processed in a conventional manner.

According to another embodiment of the invention, the fitted part, after leaving the form tool, is subjected to a second annealing treatment at, for example, at a temperature of 140° to 200° C. for a period of two hours to two minutes. The temperature setting should be at least 10° C. under the melting point of the binding component. As in the previously disclosed first annealing step, a crystallization of the predrawn polyethylene terephthalate apparently occurs, resulting in a significant increase in the thermal stability of the fitted part.

A clear increase in thermal stability is attained within the scope of the invention by means of a first annealing operation during the pre-compacting process step, a second annealing process following the molding operation, or both.

It was not expected that a pronounced affect on the stability properties of the finished product could be achieved by annealing the polyethylene terephthalate fiber component that is present in the formed fabric. Moreover, it was unforeseeable that multiple annealings at different times during the process would furnish the best results.

To make a desired fitted part (such as an inside roof lining for a motor vehicle) especially stiff, a preferred embodiment of the method according to the present invention anticipates using a three-layer laminate as a formed fabric base. The two outer layers consist entirely of fibers having a core/sheathing arrangement. The core is drawn polyethylene terephthalate having a melting temperature of about 260° C.; the sheathing is made up of copolyester which melts at about 200° C. These fibers can be obtained commercially and, thus, are readily available. The middle layer is comprised of about 80% by weight of the same fiber type as the outer layers, about 10% by weight of drawn polyethylene terephthalate fibers having a titer of 17 decitex, and about 10% by weight of drawn polyethylene terephthalate fibers having a titer of 6 decitex. The outer layers are somewhat stiffer than the inner layer, and the thus-formed laminate has a cushion-like character, which has a pleasant feel to it.

EXAMPLES

The advantages of the invention are demonstrated in greater detail in the following examples:

A three-layer, formed fabric laminate was manufactured by means of the above carding, needle punching, thermal pre-compacting steps, followed by treatment in a preheating oven for three minutes at a circulating air temperature of 170° C. and molding in a form tool at $5 \times 10^5$ Pa for a duration of 1.5 minutes and at a temperature of 120° C.

The outer layers of the three-layer, formed fabric laminate consisted of 6 decitex bicomponent conjugated fibers having a staple length of 60 mm. These bicomponent conjugated fibers also had a core of drawn polyethylene terephthalate with a melting temperature of 260° C. and a sheathing of copolyester with a melting point of 200° C. The fibers were acquired commercially from the Firm Unitika, Japan, under the description "Unitika 2080."

The middle layer was manufactured from 80% by weight of the above-mentioned bicomponent conjugated fibers, 10% by weight of simple, drawn polyethylene terephthalate fibers having a titer of 17 decitex, and 10% by weight of drawn polyethylene terephthalate fibers having a titer of 6 decitex.

Samples of the three-layer fabric were subjected to one or more annealing treatments in various phases of the manufacturing process, with manufacturing conditions otherwise the same.

Twenty-five samples of the three-layer fabric were produced. Each of five groups of five samples was subjected to one of the five different thermal pretreatments, according to the following scheme:
1) One group was only needle-punched in advance, without any further thermal treatment.
2) Another group, after treatment in accordance with 1), additionally underwent a temperature treatment of 150° C. for two hours.
3) Another group, after treatment in accordance with 1), additionally underwent a temperature treatment of 220 ° C. for three minutes.
4) Another group, after treatment in accordance with 3), additionally underwent a temperature treatment of 150° C. for two hours.
5) Another group, after treatment in accordance with 1), underwent a temperature treatment of 220° C. for over two hours.

All samples were subsequently preheated between two heated plates for three minutes at a temperature of 250° C. Samples from each of the five groups treated according to the above thermal pretreatments 1) to 5) underwent the following additional treatments:
a) One sample from each of the groups underwent 3 mm deformation in a tool at room temperature for a one minute period.
b) A second sample from each of the groups underwent 3 mm deformation in a tool at 125° C. for a one minute period of dwell.
c) A third sample from each of the groups underwent 3 mm deformation in a tool at 185° C. for a thirty minute period of dwell.
d) A fourth sample from each of the groups underwent treatment as in a), followed by an additional heat treatment outside of the tool at 150° C. for two hours.

e) A fifth sample from each of the groups underwent treatment as in b), followed by an additional heat treatment outside of the tool at 150° C. for two hours.

For each of the above-prepared 25 samples, the modulus of elasticity at bending was measured in accordance with the standard EN 63 at 90° C. Moreover, for specific samples, the corresponding values were measured at a room temperature of 23° C.

Table 1 shows a two-temperature comparison of test results for a few specific samples. Specifically, modulus of elasticity at bending (in units of $N/mm^2$) was measured according to EN 63 at 23° C. and 90° C. for a substance weight of 1000 $g/m^2$ and a thickness of 3 mm.

Table 2 shows the modulus of elasticity at bending at 90° C. for all 25 tests, as described above. Specifically, modulus of elasticity at bending (in units of $N/mm^2$) was measured according to EN 63 at 90° C. for a substance weight of 1000 $g/m^2$ and a thickness of 3 mm.

TABLE 1

| Sample # | Temperature | |
|---|---|---|
| | 23° C. | 90° C. |
| 1a | 136 | 14 |
| 1d | 155 | 36 |
| 3a | 177 | 18 |
| 3d | 200 | 54 |

TABLE 2

| Additional Treatment | Thermal Pretreatment | | | | |
|---|---|---|---|---|---|
| | 1 | 2 | 3 | 4 | 5 |
| a | 14 | 13 | 18 | 19 | 24 |
| b | 14 | 20 | 22 | 22 | 27 |
| c | 32 | 33 | 53 | 51 | 64 |
| d | 36 | 38 | 54 | 58 | 97 |
| e | 40 | 70 | 51 | 60 | 71 |

What is claimed is:

1. A method for manufacturing an interior fitted part for motor vehicles comprising:
    carding a fabric comprising a matrix component and at least about 40% by weight of a binding component, said matrix component comprising drawn polyethylene terephthalate matrix fibers having a staple length of about 15 to about 100 mm and a titer of about 4 to about 30 decitex, said binding component comprising binding fibers selected from undrawn polyethylene terephthalate fibers and copolyester fibers, said binding fibers having a staple length of about 15 to about 100 mm, a titer of about 4 to about 30 decitex and a melting point that is about 30° to about 120° C. lower than that of said matrix fibers;
    pre-compacting said fabric using a technique selected from needle punching, surface heating, and a combination of needle punching surface heating;
    preheating said fabric in a preheating oven for a period of about one to about five minutes at a temperature which lies about 10° to about 30° C. above the melting temperature of said binding fibers and below the melting temperature of said matrix fibers;
    subjecting said fabric to a molding pressure in a form tool at a temperature which lies at least about 10° C. below the melting point of said binding fibers; and
    annealing said fabric at a temperature ranging from about 140° to about 240° C. and for a duration ranging from about two hours down to about one minute.

2. The method according to claim 1, wherein said annealing is conducted in connection with said precompacting.

3. The method according to claim 1, wherein said annealing is step is conducted at a temperature ranging from about 140° to about 200° C. and at least about 10° C. less than the melting point of said binding component, for a duration of from about two hours down to about two minutes and after said molding step.

4. The method according to claim 2, wherein an additional annealing step is conducted at a temperature ranging from about 140° to about 200° C. and at least about 10° C. less than the melting point of said binding component, for a duration of from about two hours down to about two minutes and after said molding step.

5. A method for manufacturing an interior fitted part for motor vehicles comprising:
    carding a fabric comprising up to about 50% by weight of a matrix component and about 50 to about 100% by weight of a binding component, said matrix component comprising drawn polyethylene terephthalate matrix fibers having a staple length of about 15 to about 100 mm and a titer of about 4 to about 30 decitex, said binding component comprising bicomponent fibers having a staple length of about 15 to about 100 mm and a titer of about 4 to about 30 decitex, said bicomponent fibers selected from bicomponent fibers having a core of predrawn polyethylene terephthalate and having a sheathing of a lower melting point copolyester with a melting point that is about 30° to about 120° C. lower than that of said predrawn polyethylene terephthalate and bicomponent fibers wherein predrawn polyethylene terephthalate fibers and lower melting point copolyester fibers with a melting point that is about 30° to about 120° C. lower than that of said predrawn polyethylene terephthalate are combined in a side-by-side arrangement;
    pre-compacting said fabric using a technique selected from needle punching, surface heating, and a combination of needle punching surface heating;
    preheating said fabric in a preheating oven for a period of about one to about five minutes at a temperature which lies about 10° to about 30° C. above the melting temperature of said binding fibers and below the melting temperature of said matrix fibers;
    subjecting said fabric to a molding pressure in a form tool at a temperature which lies at least about 10° C. below the melting point of said binding fibers; and
    annealing said fabric at a temperature ranging from about 140° to about 240° C. and for a duration ranging from about two hours down to about one minute.

6. The method according to claim 5, wherein said annealing is conducted in connection with said precompacting.

7. The method according to claim 5, wherein said annealing is step is conducted at a temperature ranging from about 140° to about 200° C. and at least about 10° C. less than the melting point of said binding component, for a duration of from about two hours down to about two minutes and after said molding step.

8. The method according to claim 6, wherein an additional annealing step is conducted at a temperature ranging from about 140° to about 200° C. and at least about 10° C. less than the melting point of said binding component, for a duration of from about two hours down to about two minutes and after said molding step.

9. A method for manufacturing an interior fitted part for motor vehicles comprising:
carding a fabric comprising a matrix component and from about 40 to about 90% by weight of a binding component, said matrix component comprising drawn polyethylene terephthalate matrix fibers having a staple length of about 15 to about 100 mm and a titer of about 4 to about 30 decitex, said binding component comprising binding fibers selected from undrawn polyethylene terephthalate and copolyester fibers, said binding fibers having a staple length of about 15 to about 100 mm, a titer of about 3 to about 8 decitex and a melting point of about 240° C.;
pre-compacting said fabric using a technique selected from needle punching, surface heating, and a combination of needle punching surface heating;
preheating said fabric in a preheating oven for a period of about one to about five minutes at a temperature which lies about 10° to about 30° C. above the melting temperature of said binding fibers and below the melting temperature of said matrix fibers;
subjecting said fabric to a molding pressure in a form tool at a temperature which lies at least about 10° C. below the melting point of said binding fibers; and
annealing said fabric at a temperature ranging from about 140° to about 240° C. and for a duration ranging from about two hours down to about one minute.

10. The method according to claim 9, wherein said annealing is conducted in connection with said precompacting.

11. The method according to claim 9, wherein said annealing is step is conducted at a temperature ranging from about 140° to about 200° C. and at least about 10° C. less than the melting point of said binding component, for a duration of from about two hours down to about two minutes and after said molding step.

12. The method according to claim 10, wherein an additional annealing step is conducted at a temperature ranging from about 140° to about 200° C. and at least about 10° C. less than the melting point of said binding component, for a duration of from about two hours down to about two minutes and after said molding step.

13. The method according claim 5, wherein said fabric comprises:
two outer fabric layers comprising 100% by weight of bicomponent fibers having a core of drawn polyethylene terephthalate which melts at about 260° C., a sheathing of a copolyester which melts at about 200° C. and a titer of about 6 decitex; and
an inner layer comprising about 80% by weight of said bicomponent fibers having a core of drawn polyethylene terephthalate which melts at about 260° C., a sheathing of a copolyester which melts at about 200° C. and a titer of about 6 decitex, about 10% by weight of drawn polyethylene terephthalate fibers having a titer of about 17 decitex, and about 10% by weight of drawn polyethylene terephthalate fibers having a titer of about 6 decitex.

14. The method according to claim 6, wherein said fabric comprises:
two outer fabric layers comprising 100% by weight of bicomponent fibers having a core of drawn polyethylene terephthalate which melts at about 260° C., a sheathing of a copolyester which melts at about 200° C. and a titer of about 6 decitex; and
an inner layer comprising about 80% by weight of said bicomponent fibers having a core of drawn polyethylene terephthalate which melts at about 260° C., a sheathing of a copolyester which melts at about 200° C. and a titer of about 6 decitex, about 10% by weight of drawn polyethylene terephthalate fibers having a titer of about 17 decitex, and about 10% by weight of drawn polyethylene terephthalate fibers having a titer of about 6 decitex.

15. The method according claim 7, wherein said fabric comprises:
two outer fabric layers comprising 100% by weight of bicomponent fibers having a core of drawn polyethylene terephthalate which melts at about 260° C., a sheathing of a copolyester which melts at about 200° C. and a titer of about 6 decitex; and
an inner layer comprising about 80% by weight of said bicomponent fibers having a core of drawn polyethylene terephthalate which melts at about 260° C., a sheathing of a copolyester which melts at about 200° C. and a titer of about 6 decitex, about 10% by weight of drawn polyethylene terephthalate fibers having a titer of about 17 decitex, and about 10% by weight of drawn polyethylene terephthalate fibers having a titer of about 6 decitex.

16. The method according claim 8, wherein said fabric comprises:
two outer fabric layers comprising 100% by weight of bicomponent fibers having a core of drawn polyethylene terephthalate which melts at about 260° C., a sheathing of a copolyester which melts at about 200° C. and a titer of about 6 decitex; and
an inner layer comprising about 80% by weight of said bicomponent fibers having a core of drawn polyethylene terephthalate which melts at about 260° C., a sheathing of a copolyester which melts at about 200° C. and a titer of about 6 decitex, about 10% by weight of drawn polyethylene terephthalate fibers having a titer of about 17 decitex, and about 10% by weight of drawn polyethylene terephthalate fibers having a titer of about 6 decitex.

* * * * *